United States Patent
Shilov et al.

(10) Patent No.: US 11,576,157 B2
(45) Date of Patent: Feb. 7, 2023

(54) NR V2X SIDELINK RESOURCE SELECTION AND RESELECTION USING SCHEDULING WINDOW

(71) Applicant: Intel Corporation, Santa Clara, CA (US)

(72) Inventors: Mikhail Shilov, Nizhny Novgorod (RU); Alexey Khoryaev, Nizhny Novgorod (RU); Sergey Panteleev, Nizhny Novgorod (RU); Sergey Sosnin, Zavolzhie (RU); Andrey Chervyakov, Nizhny Novgorod (RU); Dmitry Belov, Nizhny Novgorod (RU); Artyom Putilin, Kstovo (RU)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 16/988,141

(22) Filed: Aug. 7, 2020

(65) Prior Publication Data
US 2020/0374861 A1 Nov. 26, 2020

Related U.S. Application Data

(60) Provisional application No. 62/887,446, filed on Aug. 15, 2019, provisional application No. 62/887,444, filed on Aug. 15, 2019, provisional application No. 62/887,437, filed on Aug. 15, 2019.

(51) Int. Cl.
*H04W 72/04* (2009.01)
*H04W 72/12* (2023.01)
*H04W 4/46* (2018.01)

(52) U.S. Cl.
CPC ......... *H04W 72/0406* (2013.01); *H04W 4/46* (2018.02); *H04W 72/12* (2013.01)

(58) Field of Classification Search
None
See application file for complete search history.

(56) References Cited

U.S. PATENT DOCUMENTS

| | | | |
|---|---|---|---|
| 2020/0396024 A1* | 12/2020 | Ganesan | H04L 1/1819 |
| 2021/0212026 A1* | 7/2021 | Peng | H04W 4/40 |
| 2021/0212050 A1* | 7/2021 | Lu | H04L 5/0094 |
| 2022/0095256 A1* | 3/2022 | Lee | G01S 5/021 |

* cited by examiner

*Primary Examiner* — Rebecca E Song
(74) *Attorney, Agent, or Firm* — Schwegman Lundberg & Woessner, P.A.

(57) ABSTRACT

Embodiments of a user equipment (UE) configured for NR V2X sidelink selection and reselection are generally described herein. In some embodiments, a selected set of candidate resources are scheduled using a single sidelink control information (SCI) within a scheduling window. In some embodiments, sidelink resources are excluded based on a HARQ round trip time. In some embodiments, sidelink control signalling supports the reservation and indication of multiple sidelink resources.

20 Claims, 6 Drawing Sheets

Sidelink resource allocation for HARQ process with $M = 5$, $N = 3$, $N_{SCI-MAX} = 3$ (e.g., with HARQ process prolongation)

NR V2X SIDELINK RESOURCE SELECTION AND RESELECTION USING SCHEDULING WINDOW

PRIORITY CLAIMS

This application claims priority under 35 U.S.C. 119(e) to U.S. Provisional Patent Application Ser. No. 62/887,444, filed Aug. 15, 2019, Ser. No. 62/887,446, filed Aug. 15, 2019, and Ser. No. 62/887,437, filed Aug. 15, 2019, which are incorporated herein by reference in their entirety.

TECHNICAL FIELD

Embodiments pertain to wireless communications. Some embodiments relate to fifth generation (5G) new radio (NR) communications. Some embodiments pertain to NR vehicle-to-everything (V2X) sidelink communications.

BACKGROUND

Emerging vehicle-to-everything (V2X) applications are characterized by various key performance indicators (KPIs) in terms of latency, data rate and reliability. For cellular V2X communications on the sidelink, efficient resource selection and/or reselection procedure suitable for periodic and aperiodic traffic is of high importance.

Thus, there are general needs for improved NR V2X sidelink communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments herein present mechanisms of resource selection reselection to support resource allocation for arbitrary number of resources, with various benefits (e.g., improving robustness of NR V2X sidelink communication, and improving efficiency of sidelink autonomous resource selection procedure).

Some embodiments relate NR V2X sidelink resource selection and reselection. Some embodiments relate to NR V2X sidelink control signaling to support reservation and indication of multiple sidelink resources. Some embodiments relate to Reference Signal Receive Power (RSRP) threshold measurements for NR V2X resource exclusion. Some embodiments relate to a Hybrid Automatic Repeat Request (HARD) round-trip time aware resource selection for NR V2X. These embodiments, as well as other embodiments, are disclosed and described here.

Figure 1:
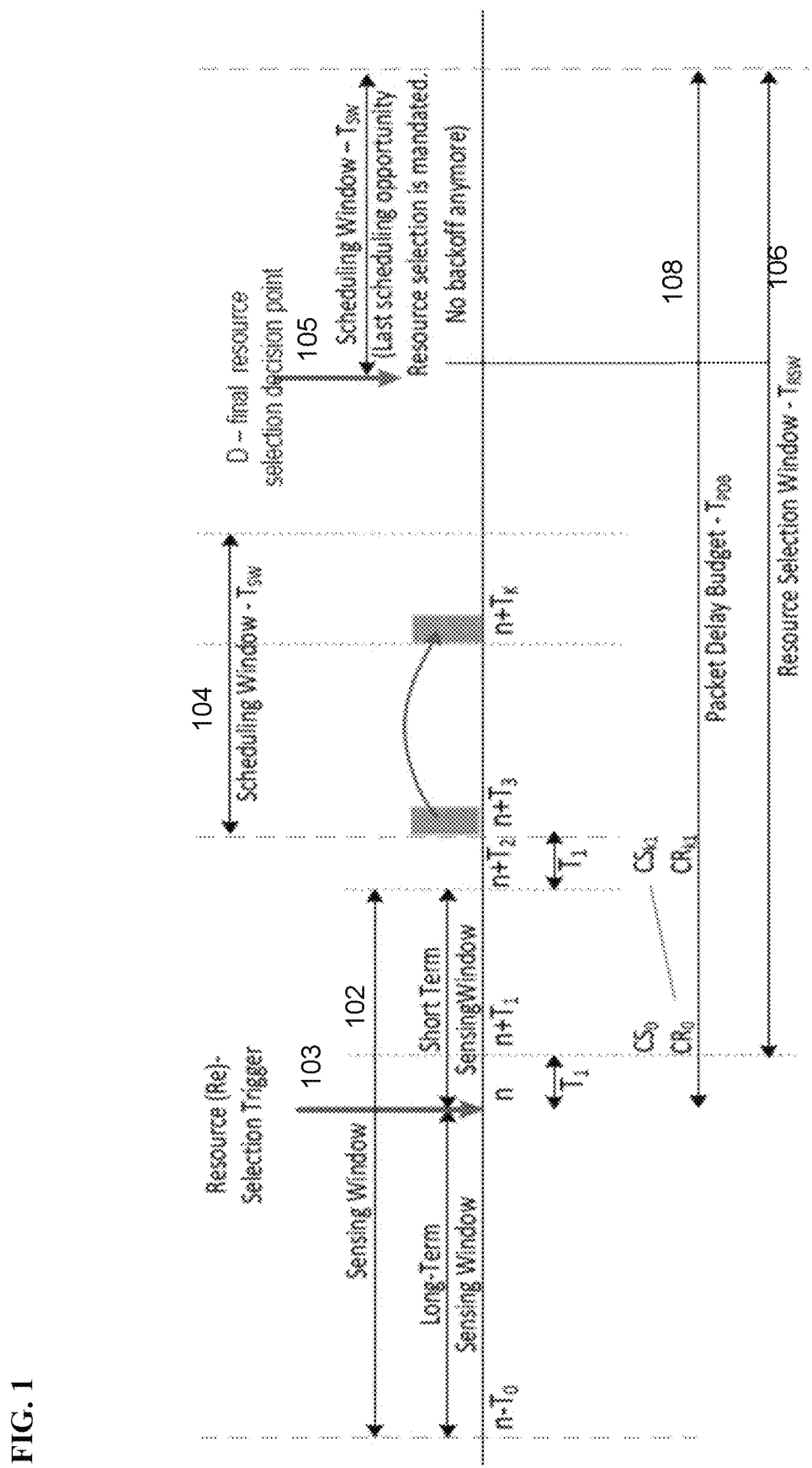
FIG. 1 illustrated sidelink resource selection in accordance with some embodiments.

FIG. 1 illustrates sidelink resource selection in accordance with some embodiments. In accordance with some embodiments, a user equipment (UE) configured for NR V2X sidelink communication. The UE may include processing circuitry; and memory. In accordance with these embodiments, the UE may be configured to monitor slots of a sidelink resource pool during a sensing window 102 except for slots in which a transmission by the UE occurs. If sidelink resource selection or reselection is triggered during the sensing window 102, the UE is configured to initiate a start of a resource selection window ($T_{RSW}$) 106 to select sidelink resources from the sidelink resource pool. The resource selection window 106 may begin after the sidelink resource selection or reselection is triggered by resource selection/reselection trigger 103. In some embodiments, the resource selection window 106 may be bounded by a remaining packet delay budget ($T_{PDB}$) 108. In some embodiments, UE may select, during the resource selection window 106, a set of candidate resources from the sidelink resource pool and generate a single sidelink control information (SCI) for transmission. In some embodiments, the single SCI may indicate the selected set of candidate resources within a scheduling window ($T_{sw}$) 104. In some embodiments, the scheduling window 104 may be within the resource selection window 106 and comprising a predetermined number of slots. In these embodiments, the single SCI may schedule sidelink resources of the selected set. In some embodiments, the memory of the UE maybe configured to store the SCI.

In accordance with some embodiments, the predetermined number of slots comprising the scheduling window 104 is thirty-two (32), although the scope of the embodiments is not limited in this respect as other numbers of slots may comprise the scheduling window 104. In some embodiments, the scheduling window 104 may end prior to a final resource selection decision point (D) 105.

In accordance with some embodiments, to select the set of candidate resources, the UE may be configured to continue to monitor the slots of the sidelink resource pool during the sensing window 102 after sidelink resource selection or reselection is triggered. During the resource selection window 106, the UE may be configured to form sets of candidate resources (e.g., using a resource exclusion procedure), and configure lower layers to transmit a physical sidelink control channel (PSCCH) and a physical sidelink shared channel (PSSCH). In some embodiments, the PSCCH may include the single SCI transmitted before an end of the scheduling window 104. In some embodiments, the PSSCH may comprise corresponding data within a selected set of sidelink resources that are scheduled by the SCI.

In accordance with some embodiments, for feedback-based transmissions, the set of candidate resources from the sidelink resource pool may be selected to allow feedback for the PSCCH/PSSCH transmission of a transport block (TB). In some embodiments, resources of the set may be excluded within a time interval (THARQ) from a previously selected resource, although the scope of the embodiments is not limited in this respect.

In accordance with some embodiments, the time interval (THARQ) may be determined from a round-trip HARQ time including a physical sidelink feedback channel (PSFCH) processing delay, although the scope of the embodiments is not limited in this respect.

In accordance with some embodiments, the single SCI, transmitted on the PSCCH, may be configured to reserve sidelink resources for up to one or more blind retransmissions and for up to one or more feedback-based transmissions. In these embodiments, the UE may be configured by a reconfiguration message received from a generation Node B (gNB) over a NR-Uu interface with a predetermined maximum number ($N_{SCI-max}$) of sidelink resources that can be indicated by the single SCI. In some embodiments, the maximum number ($N_{SCI-max}$) of sidelink resources that can be indicated by the single SCI may be either 2 or 3.

In accordance with some embodiments, the scheduling window 104 may be a maximum time that can be allocated by the single SCI. In some embodiments, the scheduling window 104 may be no greater than a time between a first and last PSCCH and PSSCH transmissions that are scheduled by the SCI.

In accordance with some embodiments, sidelink resource selection/reselection may be triggered on receipt of new packet at a physical layer (PHY) if resources are needed for transmission of the new packet if no sidelink resources are reserved for transmission of the packet, if the packet is not able to be transmitted within currently reserved sidelink resources (e.g., insufficient resources, target QoS not guaranteed), if a resource reservation for reserved sidelink resources has expired, or if a channel occupancy limit is applied (e.g., due to detection of high congestion level in medium).

In accordance with some embodiments, the UE may be configured to measure an RSRP on PSCCH and/or PSSCH scheduled by a received SCI in the monitored slots and perform resource exclusion based on the RSRP measurements and comparison to an RSRP threshold. In some embodiments, the UE may form the sets of candidate resources based on non-excluded resources. In some embodiments, the UE may be configured to adjust the RSRP threshold so that the candidate resource set has sufficient resources for transmission of a transport block, although the scope of the embodiments is not limited in this respect. In some embodiments, illustrated in FIG. 2, the UE may utilize an RSRP threshold measurement window 202 and a sliding scheduling window 104. These embodiments are described in more detail below.

In accordance with some embodiments, if the scheduling window 104 has a duration that exceeds a duration of the resource selection window 106, the UE may be configured to reduce the duration of the scheduling window 104 to align with the resource selection window 106. If the scheduling window 104 has a duration that is less than the duration of the resource selection window 106, the UE may be configured to shift the scheduling window 104 within the resource selection window 106 up to a final resource selection decision point 105. In some embodiments, the final resource selection decision point 105 may be determined based in part on a latency requirement or a priority level of the data. In these embodiments, up to the final resource selection decision point 105, sidelink resources may be selected without further backoff, although the scope of the embodiments is not limited in this respect.

Some embodiments are directed to a generation node B (gNB) configured for operating in a 5G NR network. The gNB may comprise processing circuitry and memory. In these embodiments, the gNB may be configured to encode signalling for transmission to user equipment (UE) over a Uu interface to configure the UE for NR V2X sidelink communication. In some embodiments, the signalling may be encoded to indicate resources of a sidelink resource pool. In some embodiments, the signalling may be encoded to indicate a predetermined number of slots comprising a scheduling window ($T_{SW}$) for the UE to indicate a set of candidate resources selected from the sidelink resource pool within using a single sidelink control information (SCI). In some embodiments, the signalling may be encoded to indicate a predetermined maximum number (NSCI-max) of sidelink resources that are to be indicated by the single SCI. In some embodiments, the memory is configured to store the RRC signalling. In some embodiments, the predetermined number of slots comprising the scheduling window is 32. In some embodiments, the predetermined maximum number of sidelink resources that are to be indicated by the single SCI is either 2 or 3.

In embodiments directed to resource selection and scheduling windows, in order to describe resource selection procedure, additional windows in time called 'scheduling windows' are introduced. The duration of a scheduling window may be determined by the maximum possible time gap between the first and last PSCCH/PSSCH resource indicated by a given SCI transmission and denoted by $T_{SW}$. Scheduling window duration ($T_{SW}$) can be either predefined by a specification or configurable. In order to simplify UE implementation scheduling window duration can be predefined to 16 or 32 slots and possibly scaled depending on the subcarrier spacing (SCS).

If current scheduling window duration exceeds remaining resource selection window duration, then for the purpose of resource selection, the scheduling window is reduced to remaining resource selection window in order to avoid scheduling beyond resource selection window. Otherwise, nominal scheduling window duration is used in resource selection procedure.

In accordance with some embodiments, as scheduling window may be defined as a maximum time interval ($T_{SW}$) that can be allocated by single SCI transmission (e.g., maximum time between the first and the last transmission PSCCH/PSSCH transmission scheduled by single SCI).

Scheduling window duration is predefined by specification (e.g. 32 slots).

Single SCI support indication of up to NPSCCH/PSSCH resources within scheduling window.

In order to have a common understanding of resource selection procedure it is also important to introduce definition of the following time instances:

n—time instance of resource (re)-selection trigger $T_0$—offset toward time instance where sensing window starts (long-term sensing window duration)

$T_1$—resource (re)-selection processing delay $T_2$—offset toward time instance where sensing window ends for initial transmission ends $T_3$—offset to the first PSCCH/PSSCH transmission after time instance of resource (re)-selection trigger Resource (Re)-Selection Triggers: he following events may trigger sidelink resource (re-)selection for NR V2X communication:

UE determines that a new packet is arrived and there is no sidelink resources reserved for its transmission UE determines that new packet is arrived and cannot be transmitted in reserved resources (e.g. lack of reserved sidelink resources, the target QoS level is not guaranteed)

UE determines that resource reservation is expired (based on timer or counter of transmitted TBs) and new packet is arrived It is applicable to semi-persistent transmission scheme UE determines that resource which is used for actual transmission (e.g., after transmission announcement in PSCCH by means of scheduling assignment or reservation signaling) was preempted by other UE transmission and new resource selection condition is met.

Resource selection condition in case of preemption is to be defined.

UE congestion control entity detects high congestion level in the medium and apply channel occupancy limit Embodiments herein may present the following mechanisms.

Define at least the following resource (re)-selection triggers:

UE determines that a new packet is arrived and there is no sidelink resources reserved for its transmission UE determines that new packet is arrived and cannot be transmitted in reserved resources (e.g. lack of reserved sidelink resources, the target QoS level is not guaranteed)

UE determines that resource reservation is expired (based on timer or counter of transmitted TBs) and new packet is arrived It is applicable to semi-persistent transmission scheme UE congestion control entity detects high congestion level in the medium and apply channel occupancy limit Resource Selection Procedures: Following resource (re) selection procedure principles, described in previous sections, the different implementations of the resource (re) selection procedure are possible. In this section, embodiments herein present three alternatives of resource (re)selection procedure.

Procedure #1

Once resource (re)-selection is triggered at time instance n, UE forms candidate resource set $CS_{n+T_1}$ (also called CS zero $CS_0$) at time instance $(n+T_1)$ based on resource exclusion procedure operating in window $[(n-T_0), n]$ and use it to select subset of $M_{CR}$ tentative candidate resources $TCR_{n+T_1}$ (also called TCR zero $TCR_0$).

Each generated candidate resource set is composed from at least $M_{CS}$ candidate resources or more. Number of tentatively selected candidate resources $M_{CR}$ is equal to amount of resources intended to be signaled by SCI (e.g., $M_{CR}=N$). It is assumed that PSCCH and PSSCH resources are associated and selected together.

When selecting $M_{CR}$ tentative candidate resources for transmission UE prioritizes selection of at least one earliest in time candidate resource among $M_{CS\text{-}EIT}$ earliest in time resources ($M_{CS\text{-}EIT} < M_{CS}$) in order to announce its scheduling decision by PSCCH as soon as possible. Other resources may be selected randomly.

UE continues to monitor transmissions within extended resource selection window (e.g., long term+short term sensing window $[(n-T_0),(n+T_2)]$. The time instance $(n=T_2)$, is ahead by $T_1$ (resource re-selection processing time), the time instance $(n+T_3)$ corresponding to the first in time tentative resource for transmission determined by $TCR_{n+T_2}(0)$.

For time instance $(n+T_3)$, UE forms the new candidate set of resources $CS_{n+T_s}$ (also called CS one—$CS_1$)) and tentative sidelink transmission resources $TCR_{n+T_s}$ (also called $TCR_1$). If the first in time resource from $TCR_{n+T_s}$ is a part of $CS_{n+T_s}$ (e.g., there is no collision), UE use this resource for transmission and selects remaining (N-1) resources either from $TCR_{n+T_s}$ or $CS_{n+T_s}$. Otherwise, if the first in time resource from $TCR_{n+T_s}$ is not a part of $CS_{n+T_s}$ (e.g., there is a collision), UE continues monitoring until the next time instance $(n+T_2)$ determined by the first in time resource in $TCR_{n+T_s}(0)$. Then above process is repeated till the time instance n+D when resources are mandated to be selected for transmission, where D designates the offset to the resource selection decision point, if selection has not happened before.

Embodiments may include the following details:

When resource (re)-selection is triggered at time instance n,

Step 0—UE forms initial candidate resource set $CS_0$ at time instance $(n+T_1)$ composed of $M_{CS}$ resources based on sensing results collected in time window $[(n-T_0),n]$ Step 1—UE processes $CS_0$ and selects N tentative candidate resources $TCR_0$ ordered in time for transmission intended to be signaled in SCI The first entry in $TCR_0$ is selected from $CS_0$ by randomly picking one resource out of $M_{CS\text{-}EIT}$ earliest in time resources from $CS_0$ ($M_{CS\text{-}EIT} < M_{CS}$)

Step 2—UE continues to monitor transmissions within resource selection window till the time instance $(n+T_2)$ and forms $CS_1$ and $TRC_1$ based on sensing window $[(n-T_0), (n+T_2)]$ Step 3A—If the first in time resource from $TCR_0$ is a part of $CS_1$ (e.g., there is no collision), UE use this resource for transmission and selects remaining (N-1) resources either from $TCR_1$ or $CS_1$ Step 3B—If the first in time resource from $TCR_0$ is not a part of $CS_1$ (e.g., there is a collision), UE continues monitoring until the next time instance $(n+T_2)$ determined by the first in time resource in $TCR_1$. The above process is repeated starting from Step 1 by setting $CS_0=CS_1$, $TCR_0=TCR_1$.

Procedure #2

For each slot, UE forms candidate resource set based on sensing and resource selection procedure using preconfigured sensing window (e.g. long-term sensing window). Resource (re)-selection is triggered at time instance n.

For the time instance $(n+T_1+k)$, UE forms

Candidate resource set $CS_{(n+T_1+k)}$ of size $M_{CS}$ or larger

Subset of ordered in time tentative candidate resources $TCR_{(n+T_1+k)}$ of size $M_{CR}$ selected for transmission based on sensing and resource exclusion procedure operating over the time window at $[(n-T_0), (n+k)]$.

The value of $M_{CR}$ is equal to amount of resources intended to be signaled by future SCI (e.g., $M_{CR}=N$) at time instance $(n+T_3)$.

When selecting $M_{CR}$ tentative candidate resources for transmission UE prioritizes selection of at least one earliest in time candidate resource among $M_{CS\text{-}EIT}$ earliest in time resources ($M_{CS\text{-}EIT} < M_{CS}$) in order to announce its scheduling decision by PSCCH as soon as possible.

The value of $T_3$ is determined by the minimum offset $k_1$ that satisfies the following conditions ($TCR_{n+T_2+k_1}(0)=0$) and ($k_1 < D$):

$$T_3 = k_1 + T_1$$

Final set of resources for transmission is determined by $TCR_{n+T_1+k_1}$ The value of $T_3$ is determined by the offset $k_1=D$ when $TCR_{n+T_1+D}$ $T_3 = D + T_1$ Final set of resources for transmission is determined by $TCR_{n+T_1+D}$ here D designates the offset to the resource selection decision point, if selection has not happened before.

Procedure #3

Once resource (re)-selection is triggered at time instance n, UE forms candidate resource set $CS_{n+T_1}$ at time instance (n+$T_1$) based on resource exclusion procedure operating in window [(n-$T_0$),n] and use it to select subset of $M_{CR}$ tentative candidate resources $TCR_{n+T_1}$.

Each generated candidate resource set is composed from at least $M_{CS}$ candidate resources or more. Number of tentatively selected candidate resources $M_{CR}$ is equal to amount of resources intended to be signaled by SCI (e.g., $M_{CR}$=N). It is assumed that PSCCH and PSSCH resources are associated and selected together.

When selecting $M_{CR}$ tentative candidate resources for transmission UE prioritizes selection of at least one earliest in time candidate resource among $M_{CS-EIT}$ earliest in time resources ($M_{CS-EIT}$<$M_{CS}$) in order to announce its scheduling decision by PSCCH as soon as possible. Other resources may be selected randomly.

Use the selected tentative candidate resources $TCR_{n+T_1}$ as reference tentative candidate resources set RTCR, e.g., RTCR=$TCR_{n+T_1}$ If RTCR(0)=0 then,
$T_3$=$T_1$
otherwise,
For each time instance t=n+$T_1$+k, where $k \in [1, TCR_{n+T_1}(0)-T_1]$, UE forms candidate resource set $CS_t$ of size $M_{CS}$ or larger UE forms subset of ordered in time tentative candidate resources $TCR_t$ of size $M_{CR}$ selected for transmission based on sensing and resource exclusion procedure operating over the time window at [(n-$T_0$), (t-$T_1$)].

UE compares $TCR_t(0)$ and RTCR(0) time instances and if $TCR_t(0)$ is earlier than RTCR(0), then the RTCR set is replaced with $TCR_t$, e.g., RTCR=$TCR_t$ If RTCR(0) belongs to the time instance t, then
$T_3$=k+$T_1$ and
Iteration over time instances stopped For time instance (n+$T_3$), UE forms the candidate set of resources $CS_{n+T_s}$ and tentative sidelink transmission resources $TCR_{n+T_s}$. If the first in time resource from RTCR is a part of $CS_{n+T_s}$ (e.g., there is no collision), UE use this resource for transmission and selects remaining (N-1) resources either from RTCR or $CS_{n+T_s}$. Otherwise, if the first in time resource from $TCR_{n+T_2}$ is not a part of $CS_{n+T_s}$ (e.g., there is a collision), UE continues monitoring until the next time instance (n+$T_2$) determined by the first in time resource in $TCR_{n+T_s}$. Then above process is repeated till the time instance n+D when resources are mandated to be selected for transmission, where D designates the offset to the resource selection decision point, if selection has not happened before.

Some embodiments pertain to RSRP threshold measurements for NR V2X sidelink resource exclusion and a HARQ round-trip time aware resource selection procedure. These embodiments are directed to advances in the legacy LTE V2X framework that are directed to:

Higher sensitivity to half-duplex
Link budget limitations
Issues in handling traffic types with variable packet sizes and QoS for periodic semi-persistent processes
Improving robustness of NR V2X sidelink communication
Simplifying the procedure of resource selection for support of feedback based sidelink transmissions NR V2X Sidelink Sensing and RESOURCE SELECTION NR V2X Sidelink Resource Allocation. UE autonomous sidelink resource allocation for NR V2X communication is likely to define and comprise the following physical layer procedures:

Sensing procedure
Resource exclusion procedure
Resource selection procedure
Sensing For NR-V2X communication, sensing window starts ahead of resource (re)-selection trigger (at time instance n) and continues after resource (re)-selection trigger till the time instance (n+$T_2$), which is determined by the first sidelink transmission minus UE processing delay on resource selection. The NR-V2X sensing window has variable duration and can be viewed as a sensing window composed from two parts (see FIG. 1):

Long-term sensing window (LT-SW) which is a sensing window that UE is expected to monitor ahead of each resource (re)-selection trigger (at time instance: n)
Long term sensing window has configurable and fixed duration—$T_0$
Short term sensing window (ST-SW) which is a sensing window that starts immediately after resource (re)-selection trigger, e.g. at time instance (n+1) and continues till the time instance (n+$T_2$) which is determined by the first sidelink transmission at (n+$T_3$) minus UE processing delay on resource selection $T_{proc}$ ($T_{Sel\_Delay}$).

Principle of Resource Exclusion Procedure

For resource exclusion procedure the following principles can be used:

UE processes sensing window in the past to exclude resources in future resource selection window
Exclusion of resources is controlled based on SCI decoding and processing of resource reservation information for transmissions pointing to resources reserved in resource selection window
Resource exclusion is based on RSRP measurements in sensing window and comparison of measurements with RSRP threshold
UE utilizes non-excluded resources to forms candidate resource set which size includes at least $M_{CS}$ candidate resources or more. If candidate resource set has less resources RSRP threshold in resource exclusion procedure is increased Resource Selection and Scheduling Windows: In order to describe resource selection procedure, embodiments include an additional window in time called scheduling window. (see FIG. 1) The duration of scheduling window is determined by the maximum possible time gap between the first and last PSCCH/PSSCH resource indicated by a given SCI transmission and denoted by $T_{SW}$.

Scheduling window duration ($T_{SW}$) can be either predefined by specification or configurable. In order to simplify UE implementation scheduling window duration can be predefined to 16 or 32 slots and possibly scaled depending on SCS settings.

Embodiment Set 1:

Scheduling window, is defined as a maximum time interval ($T_{SW}$) that can be allocated by single SCI transmission (i.e. maximum time between the first and the last PSCCH/PSSCH transmission scheduled by single SCI)

Single SCI support indication of up to NPSCCH/PSSCH resources within single scheduling window Scheduling window duration is predefined by specification or configurable (e.g. 8, 16, 32, 64, 128 slots)

Embodiment Set 2:

If the first in time scheduling window duration exceeds resource selection window duration, then the scheduling window is reduced to align with resource selection window duration possibly with some additional margin If the first scheduling window duration is less than resource selection window duration, then the scheduling window may shift within resource selection window till the deadline point D, where resources can be selected w/o further back off The offset D (value of the deadline point) can be a function of priority/latency of the traffic Introduce definition of the following time instances:
n—time instance of resource (re)-selection trigger
$T_0$—offset toward time instance where sensing window starts (long-term sensing window duration)
$T_1$—resource (re)-selection processing delay
$T_2$—offset toward time instance where sensing window ends for initial transmission ends
$T_3$—offset to the first PSCCH/PSSCH transmission after time instance of resource (re)-selection trigger
n+D—time offset towards the last scheduling window inside resource selection window deadline for last resources selection opportunity.

Figure 2:
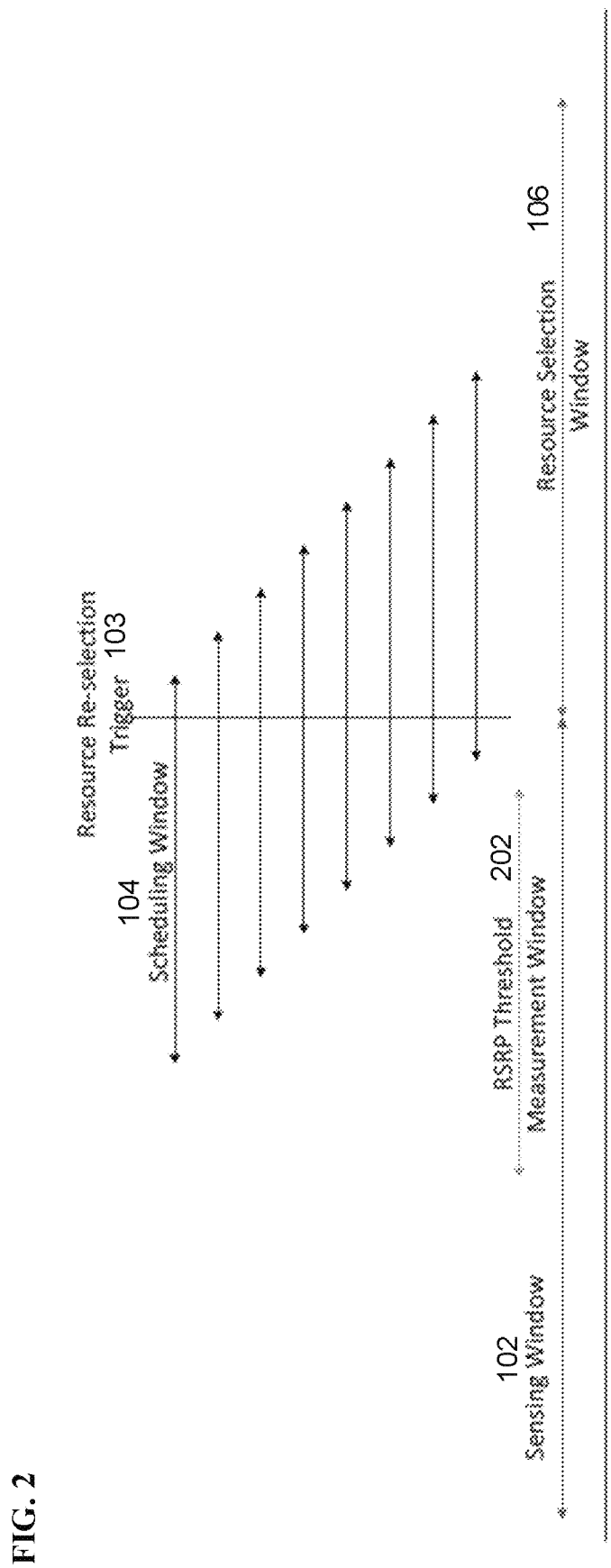
FIG. 2 illustrates measurement of Reference Signal Receive Power (RSRP) threshold for resource exclusion in accordance with some embodiments.

FIG. 2 illustrates measurement of RSRP threshold for resource exclusion in accordance with some embodiments. Use of RSRP threshold to exclude reserved resources is one of the main principles for resource exclusion procedure. In case of aperiodic traffic, the amount of information on occupied resources is reduced towards the end of resource selection window due to signaling limitations (scheduling window to address resources). At the time of resource reselection trigger (time instance–n), there is a lack of information on actual slot utilization at the end of resource selection window. Therefore, many resources in the $2^{nd}$ half of resource selection window are considered as non-occupied, while resources in the $1^{st}$ half of window are excluded with high probability. In order to reduce this effect and bias in resource exclusion, RSRP threshold can be estimated at time interval preceding resource selection window. The RSRP threshold that excludes predefined portion of resources in "RSRP threshold measurement window" can be used for resource exclusion to form candidate set of resources in resource selection/scheduling window.

Embodiments are directed to processing the window in the past and by actual measurements estimate the level of RSRP that results in candidate resource set of predefined size (e.g. $M_{CS}$ resources). Then this threshold is applied to exclude resources that reserved resources in resource selection window.

Embodiment Set 3:

RSRP threshold used for resource exclusion procedure is measured within "RSRP threshold measurement window" located inside of the sensing window right before resource reselection trigger The duration and location of "RSRP threshold measurement window" is configured to UE Measured RSRP threshold is applied as an initial threshold to transmissions that have reserved resources in resource selection window If the measured RSRP threshold does not result in candidate resource set of predefined size the measured RSRP threshold is adjusted to guarantee required size of the candidate resource set Support of Feedback Based Transmissions HARQ Round Trip Time Aware Resource Selection Procedure Unified mechanism of resource selection is desirable for blind and feedback-based retransmissions. The resource selection for feedback-based modes may be implemented using two options:

Option 1. Resource selection design is reused for feedback-based modes. In this case, the quite complex timing relationship between PSCCH/PSSCH transmission and PSFCH response as well as receiver assumptions on HARQ combining to generate feedback need to be defined. In this scenario, it may happen that several blind PSCCH/PSSCH transmissions occur before actual feedback is received from the UE receiver. This approach mainly affects HARQ timing procedures Option 2. Resource selection design is modified for feedback-based modes. In this case, resource selection ensures that resources are selected in a way that there is an opportunity to send feedback for each PSCCH/PSSCH transmission of a given TB. This approach may need to make sure that there is a minimum time gap is preserved between all resources selected by transmitter. In order to accommodate this, the random selection from candidate resource set need to be modified. The simple way to do it is as follows:

Action 0—Generate candidate resource set CS and select the first resource from candidate resource set using the default resource selection procedure Action 1—Update candidate resource set by excluding resources within time interval THARQ from the previously selected resource, where THARQ is determined by HARQ round trip time including PSFCH processing delay Action 2—Select next resource from the updated candidate resource set using the default resource selection procedure Action 3—If additional resource needs to be selected at a later time instance continue sensing till this time instance and go to Action 1

Embodiment Set 4:

For feedback-based transmission, support HARQ round trip time aware resource selection procedure, where selected resources are allocated apart by at least THARQ from each other When UE disables sidelink feedback, it automatically switches to resource selection procedure developed for blind retransmissions, i.e. there is no time gap restriction b/w selected resources Some embodiments pertain to V2X sidelink control signalling to support reservation and indication of multiple sidelink resources in NR systems. These embodiments provide a NR V2X Sidelink Resource Reservation Mechanism. For NR-V2X sidelink communications, a resource reservation mechanism is provided for blind and feedback-selective control information (SCI) based retransmissions. When a single TB is transmitted using more than one slot/TTI, the first transmission is expected to indicate the repetition resources to be avoided by other UEs.

Amount of Repetition Resources Reserved by Single Transmission

In order to support sidelink resource reservations for blind retransmissions, a single SCI (PSCCH) transmission can reserve sidelink resources for none, one, or more than one blind retransmission. Given that indication of multiple resources in a scheduling window increases the payload of SCI, the maximum number of resources $N_{SCI-MAX}$ can be preconfigured per pool/carrier/BWP and indicated to a UE.

Embodiment #1
- For blind transmission of a given TB, the maximum number of resources ($N_{SCI-MAX}$) indicated by SCI is configured and limited to the numbers from the following set {2, 3, 4}

Maximum Number of Retransmissions per HARQ Process

Maximum number of HARQ retransmissions can be derived based on a link budget of PSCCH, link budget gap b/w PSSCH and PSCCH and remaining packet delay budget. UE behaviour may be different depending on communication type:
- Unicast
  - Feedback based communication: TX UE may optimize SE using high code rates and rely on feedback-based retransmission. From this perspective, there is no need to limit the max amount of retransmissions.
  - For non-feedback-based communication: TX UE is expected to select an amount of resources to ensure QoS for blind retransmissions. The UE decides how many retransmissions to select.
- Groupcast—for feedback-based schemes, the same considerations as for unicast apply, for non-feedback-based operation the UE selects resources to ensure reliability with the fixed amount of retransmissions.
- Broadcast—the UE selects resources to ensure reliability with the fixed amount of retransmissions.

At present, the only motivation to limit the maximum number of retransmissions is a soft buffer management by RX UE; however, these procedures should be left up to UE implementation.

Figure 3A:
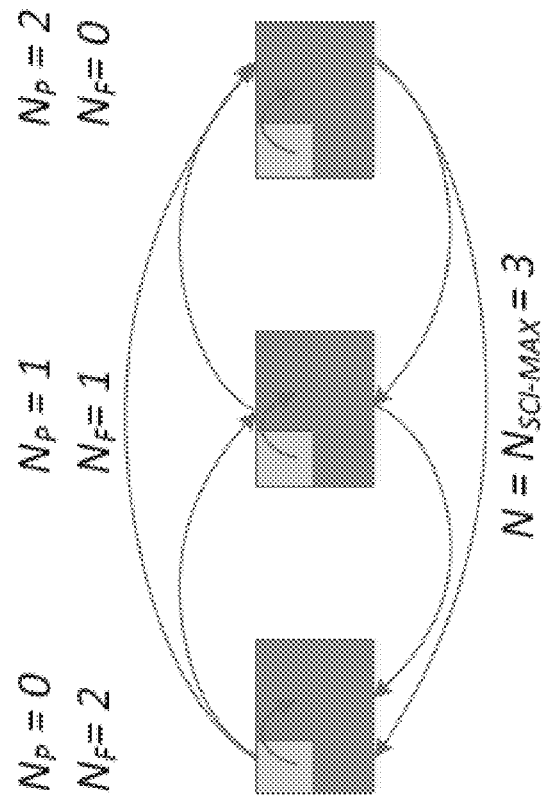
FIGS. 3A and 3B illustrate sidelink resource allocation for Hybrid Automatic Repeat Request (HARD) processes in accordance with some embodiments.
Figure 3B:
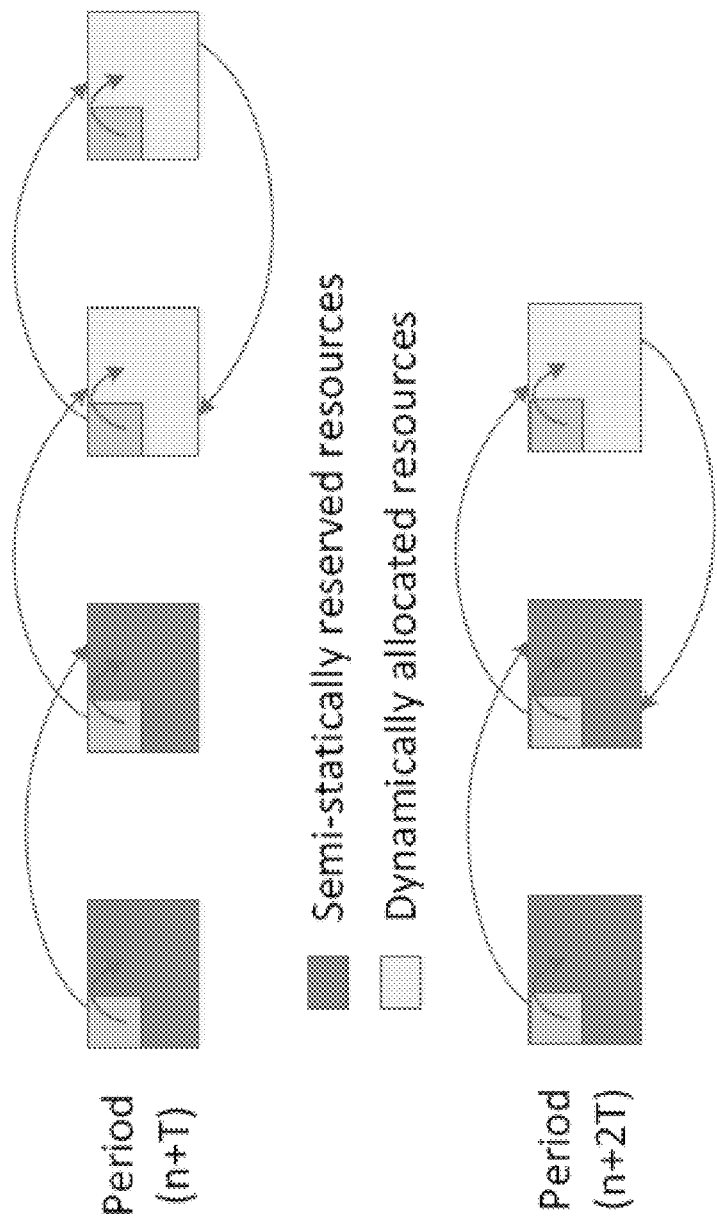

Embodiment #2
- Maximum number of retransmissions per HARQ process is not specified (e.g., there is no limitation from L1 perspective on maximum number of retransmissions per HARQ process)
- Number of blind retransmissions for a given HARQ process is decided by the TX UE and is not indicated to RX UE Prolongation of HARQ Process/Resource Reservation The number of resources indicated by a single SCI is limited by a configurable parameter NSCI-MAX={2, 3, 4} to keep control signaling overhead manageable. A UE can indicate additional resources reserved for transmission of a given TB (e.g., extend HARQ, resource reservation process beyond $N_{SCI\_MAX}$). Extra resources may be needed for feedback-based communication due to NACK or due to a large packet when N repetition resources are not sufficient from a reliability perspective or to extend periodic resource reservation due to packet variation. In order to address these scenarios, we propose the following resource allocation principles enabled by SCI signaling:

Embodiment #3
- Each TB of a given HARQ process can be transmitted M times, M is determined by the TX UE implementation and can exceed configured value of $N_{SCI-MAX}$
- Each SCI transmission points to $N \leq N_{SCI-MAX}$ resources, where $N=N_P+N_F+1$ is determined by TX UE for each HARQ process or for each SCI transmission
- $N_P$ denotes PSCCH/PSSCH resources allocated in the past, $N_F$ indicates PSCCH/PSSCH reserved/scheduled in the future $0 \leq N_P \leq (N-1)$, $0 \leq N_F \leq (N-1)$
- SCI indicates an offset to NP resources in the past and NF resources in the future relative to the slot used for SCI transmission
- N resources indicated by SCI are signalled in the scheduling window $[T_{S0}, T_{S1}]$, where $T_{S1}-T_{S0}=T_{SW}$, where $T_{SW}$ is a configured or predefined duration of the scheduling window
- When $N_F=(N-1)$, the HARQ process for a given TB is considered completed FIGS. 3A and 3B illustrate the principles described above of sidelink resource allocation through SCI signaling by illustrations for two cases, without and with prolongation. FIG. 3A Example of sidelink resource allocation for HARQ process with $M=N=3<N_{SCI-MAX}=4$ (e.g., without HARQ process prolongation). FIG. 3B illustrates examples of sidelink resource allocation for HARQ process with M=5, N=3, $N_{SCI-MAX}=3$ (e.g., with HARQ process prolongation).

Handling Packet Size and QoS Variation in Semi-persistent Processes

Traditional semi-persistent processes with fixed resource allocation cannot optimally handle variation in packet sizes and QoS given that the amount of semi-persistently reserved resources does not change across transmission periods. However, this drawback can be addressed if the UE is allowed to dynamically reserve extra resources on top of semi-persistently reserved resources.

Figure 4:
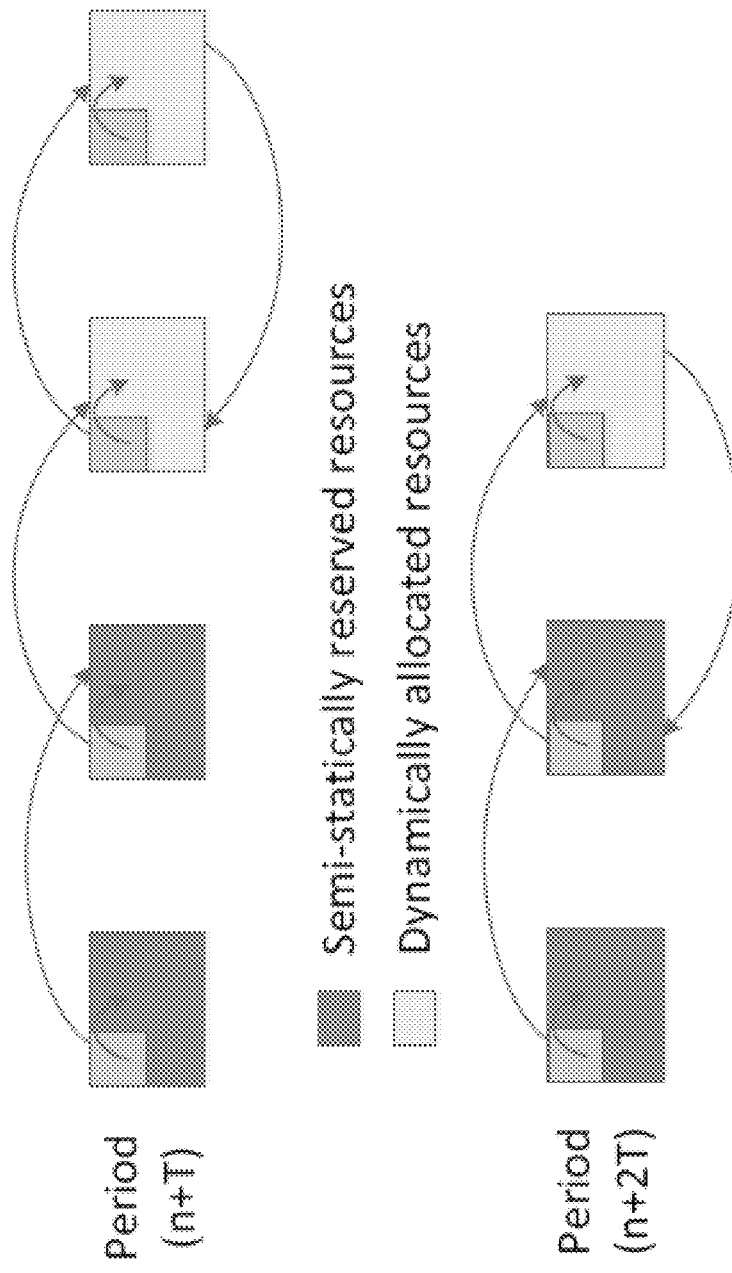
FIG. 4 illustrates dynamic prolongation of semi-persistent processes in accordance with some embodiments.

For instance, the UE may trigger a semi-persistent process and semi-statically reserve two resources. For each periodic time instance, the UE can extend semi-statically allocated resources and link to them extra dynamic resources to better handle variation in packet size in a given period. FIG. 4 illustrates dynamic extension/prolongation of semi-persistent processes.

Figure 5:
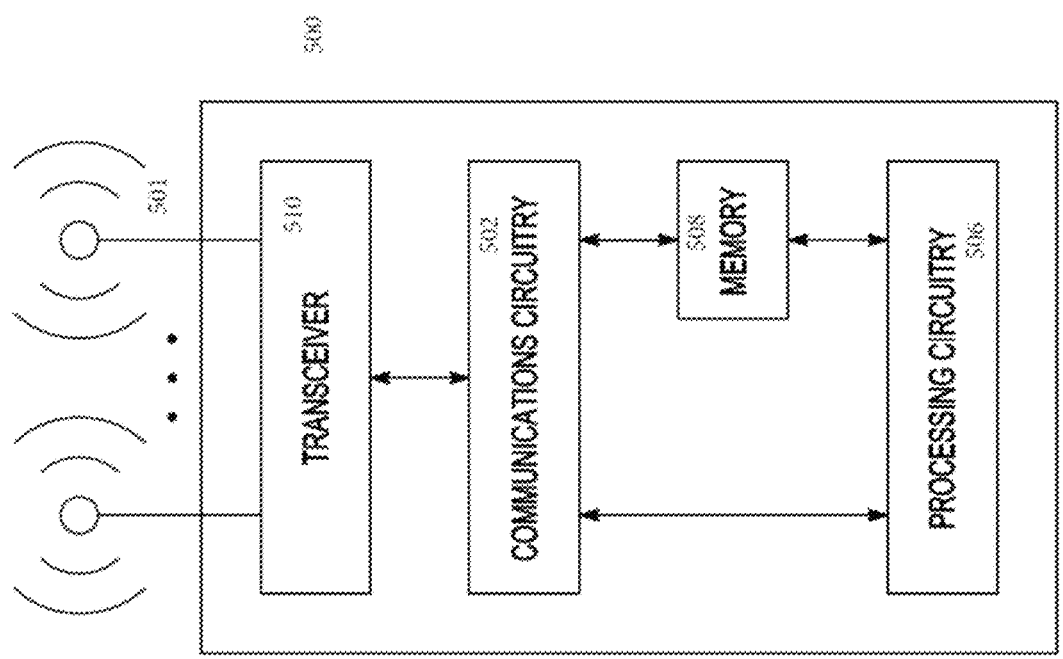
FIG. 5 is a block diagram of communication station suitable for operation as a user equipment (UE) in accordance with some embodiments.

Embodiment #4
- NR-V2X supports dynamic prolongation of semi-persistent processes
  - Semi-persistent process semi-statically allocates $N_{SPS}$ resources valid for each transmission period, where $N_{SPS}$ is semi-statically determined by UE
  - Semi-persistent process supports allocation of extra $N_D$ dynamic resources for each transmission period where $N_D$ is dynamically determined by UE FIG. 5 is a block diagram of a communication station in accordance with some embodiments. The communication station 500 may be suitable for use as a user equipment (UE) configured for operation in an 5G NR cellular network and configured for NR V2X sidelink communication. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for a new radio (NR) sidelink communication, the apparatus comprising: a processing circuitry; and a memory, wherein the processing circuitry is configured to:
   monitor slots of a sidelink resource pool during a sensing window except for slots in which a transmission by the UE occurs;
   wherein if sidelink resource selection or reselection is triggered during the sensing window, the processing circuitry is configured to:
   initiate a start of a resource selection window to select sidelink resources from the sidelink resource pool, the resource selection window to begin after the sidelink resource selection or reselection is triggered, the resource selection window being bounded by slots of a remaining packet delay budget;
   select, during the resource selection window, a set of candidate single-slot resources from the sidelink resource pool;
   generate a sidelink control information (SCI) for transmission within a slot on a physical sidelink control channel (PSCCH), the SCI to indicate the selected set of candidate single-slot resources within a scheduling window, the scheduling window comprising a number of slots beginning with the slot within which the SCI is transmitted; and
   encode the PSCCH and a corresponding physical sidelink shared channel (PSSCH) for transmission in one of the candidate single-slot resources of the slot, the PSCCH encoded to include the SCI for scheduling the selected single-slot resources,
   wherein the memory is configured to store the SCI.

2. The apparatus of claim 1, wherein the maximum number of slots comprising the scheduling window is 32.

3. The apparatus of claim 2, wherein to select the set of candidate single-slot resources, the processing circuitry is configured to:
   continue to monitor the slots of the sidelink resource pool during the sensing window after sidelink resource selection or reselection is triggered; and
   during the resource selection window, the processing circuitry is configured to:
   form the sets of candidate single-slot resources.

4. The apparatus of claim 3, wherein for feedback-based transmissions, the set of candidate single-slot resources from the sidelink resource pool is selected to allow feedback for the transmission of a transport block (TB), and
   wherein resources of the set are excluded within a time interval from a previously selected resource.

5. The apparatus of claim 4, wherein the time interval is determined from a round-trip Hybrid Automatic Repeat Request (HARQ) time including a physical sidelink feedback channel (PSFCH) processing delay.

6. The apparatus of claim 3, wherein the UE is configured by a reconfiguration message received from a generation Node B (gNB) over a NR-Uu interface with a predetermined number of slots comprising the scheduling window for the UE to indicate a set of candidate single-slot resources to be selected from the sidelink resource pool using the SCI and a predetermined maximum number of sidelink resources that are indicated by the SCI, wherein the predetermined maximum number is either two or three.

7. The apparatus of claim 1, wherein the scheduling window (Tsw) is a maximum time that can be allocated by the SCI, the scheduling window being no greater than a time between a first and last PSSCH transmissions that are scheduled by the SCI.

8. The apparatus of claim 1, wherein the sidelink resource selection or reselection is triggered on receipt of new packet at a physical layer (PHY) if resources are needed for transmission of the new packet if at least one of:
 no sidelink resources are reserved for transmission of the packet;
 the packet is not able to be transmitted within reserved sidelink resources;
 a resource reservation for reserved sidelink resources has expired; and
 a channel occupancy limit is applied.

9. The apparatus of claim 1, wherein the processing circuitry is configured to:
 measure an RSRP on a PSSCH scheduled by a received SCI in the monitored slots;
 perform resource exclusion based on the RSRP measurements and comparison to an RSRP threshold; and
 form the sets of candidate single-slot resources based on non-excluded resources,
 wherein the processing circuitry is configured to adjust the RSRP threshold so that the candidate single-slot resource set has sufficient resources for transmission of a transport block,
 wherein if the scheduling window has a duration that exceeds a duration of the resource selection window, the processing circuitry is configured to reduce the duration of the scheduling window to align with the resource selection window,
 wherein if the scheduling window has a duration that is less than the duration of the resource selection window, the processing circuitry is configured to shift the scheduling window within the resource selection window up to a final resource selection decision point (D),
 wherein the final resource selection decision point (D) is determined based in part on a latency requirement or a priority level of the data.

10. The apparatus of claim 1 wherein the processing circuitry comprises a baseband processor.

11. A non-transitory computer-readable storage medium that stores instructions for execution by a processing circuitry of a user equipment (UE) to configure the UE for a new radio (NR) sidelink communication,
 wherein the processing circuitry is configured to:
 monitor slots of a sidelink resource pool during a sensing window except for slots in which a transmission by the UE occurs;
 wherein if sidelink resource selection or reselection is triggered during the sensing window, the processing circuitry is configured to:
 initiate a start of a resource selection window to select sidelink resources from the sidelink resource pool, the resource selection window to begin after the sidelink resource selection or reselection is triggered, the resource selection window being bounded by slots of a remaining packet delay budget;
 select, during the resource selection window, a set of candidate single-slot resources from the sidelink resource pool;
 generate a sidelink control information (SCI) for transmission within a slot on a physical sidelink control channel (PSCCH), the SCI to indicate the selected set of candidate single-slot resources within a scheduling window, the scheduling window comprising a number of slots beginning with the slot within which the SCI is transmitted; and
 encode the PSCCH and a corresponding physical sidelink shared channel (PSSCH) for transmission in one of the candidate single-slot resources of the slot, the PSCCH encoded to include the SCI for scheduling the selected single-slot resources.

12. The non-transitory computer-readable storage medium of claim 11, wherein the maximum number of slots comprising the scheduling window is 32.

13. The non-transitory computer-readable storage medium of claim 12, wherein to select the set of candidate single-slot resources, the processing circuitry is configured to:
 continue to monitor the slots of the sidelink resource pool during the sensing window after sidelink resource selection or reselection is triggered; and
 during the resource selection window, the processing circuitry is configured to:
 form the sets of candidate single-slot resources.

14. The non-transitory computer-readable storage medium of claim 13, wherein for feedback-based transmissions, the set of candidate single-slot resources from the sidelink resource pool is selected to allow feedback for the transmission of a transport block (TB), and
 wherein resources of the set are excluded within a time interval from a previously selected resource.

15. The non-transitory computer-readable storage medium of claim 14, wherein the time interval is determined from a round-trip Hybrid Automatic Repeat Request (HARQ) time including a physical sidelink feedback channel (PSFCH) processing delay.

16. The non-transitory computer-readable storage medium of claim 13, wherein the UE is configured by a reconfiguration message received from a generation Node B (gNB) over a NR-Uu interface with a predetermined number of slots comprising the scheduling window for the UE to indicate a set of candidate single-slot resources to be selected from the sidelink resource pool using the SCI and a predetermined maximum number of sidelink resources that are indicated by the SCI, wherein the predetermined maximum number is either two or three.

17. The non-transitory computer-readable storage medium of claim 16, wherein the instructions configure the processing circuitry to store the SCI in a memory.

18. An apparatus of a generation node B (gNB) configured for operating in a fifth-generation (5G) new radio (NR) network, the apparatus comprising: a processing circuitry; and a memory,
 wherein the processing circuitry is configured to encode radio resource control (RRC) signalling for transmission to user equipment (UE) over a Uu interface to configure the UE for NR sidelink communication,
 wherein the RRC signalling is encoded to indicate:
 resources of a sidelink resource pool;
 a predetermined number of slots comprising a scheduling window for the UE to indicate a set of candidate single-slot resources to be selected from the sidelink resource pool using a sidelink control information (SCI); and a predetermined maximum number of sidelink resources that are to be indicated by the SCI, wherein the scheduling window comprising a number of slots beginning with a slot within which the SCI is received, and wherein the memory is configured to store the RRC signaling.

19. The apparatus of claim 18, wherein the maximum number of slots between a first and last of candidate single-slot resources scheduled by the SCI is 32, and wherein the predetermined maximum number of sidelink resources that are to be indicated by the SCI is either two or three.

20. The apparatus of claim 19, wherein the processing circuitry comprises a baseband processor configured to encode and decode signalling for transmission and reception using a plurality of antennas.

* * * * *